United States Patent [19]

Damm et al.

[11] 4,053,219

[45] Oct. 11, 1977

[54] DEVICE FOR USE IN PHOTOGRAPHICALLY PRINTING ENLARGED COPIES OF COLOR IMAGES

[76] Inventors: William R. Damm, 563 Tiffany Drive; Jerry S. Damm, 528 6th St., Apt. A, both of Hollister, Calif. 95023

[21] Appl. No.: 675,069

[22] Filed: Apr. 8, 1976

[51] Int. Cl.² .............................................. G03B 27/32
[52] U.S. Cl. .................................................... 355/27
[58] Field of Search ....................... 355/21, 27, 72, 18; 354/83, 88, 89, 92, 307–312

[56] References Cited

U.S. PATENT DOCUMENTS

| 646,699 | 4/1900 | Holmes | 354/309 |
| 870,751 | 11/1907 | Welsh | 355/27 |
| 1,198,290 | 9/1916 | Turek | 354/308 |
| 2,148,018 | 2/1939 | Goldberg | 355/18 |
| 3,644,036 | 2/1972 | Canfield | 355/72 X |
| 3,677,163 | 7/1972 | Porter | 354/307 |
| 3,811,767 | 5/1974 | Purnell | 355/27 |

FOREIGN PATENT DOCUMENTS

| 771,482 | 4/1957 | United Kingdom | 355/21 |

*Primary Examiner*—Donald A. Griffin
*Attorney, Agent, or Firm*—Huebner & Worrel

[57] ABSTRACT

The device is characterized by a cabinet including a light-tight processing chamber having a floor, a pair of laterally spaced side walls of congruent triangular configurations, a bellows cover, and a pair of closure panels for closing an access opening provided between the side walls. A repositionable lamp house is attached to and directed downwardly through the cover, while a pair of opaque sleeves is extended through the closure panels for facilitating access to the processing chamber. A readily accessible paper safe and a receptacle for a roll processing tube are provided beneath the floor of the chamber.

9 Claims, 7 Drawing Figures

DEVICE FOR USE IN PHOTOGRAPHICALLY PRINTING ENLARGED COPIES OF COLOR IMAGES

BACKGROUND OF THE INVENTION

1. Field of the Invention

The invention generally relates to a photographic device and more particularly to a portable device for printing enlarged copies of color images, having particular utility in the home and similar installations. 2. Description of the Prior Art Photographic color enlargers are, of course, notoriously old. Frequently, such devices include three-color filter packs adapted to be positioned in intercepting relation with light beams propagated by suitable sources. The filters, of course, divide the beams into color portions which are passed through suitable optics and caused to illuminate and thus expose a film or light sensitive paper hereinafter collectively referred to as sensitized paper. Subsequently, the exposed sensitized paper is placed in a bath of chemicals for thus fixing an image thereon.

Normally, this process is carried out in a permanently fixed facility such as a so-called dark room so constructed as to preclude entry of light from external sources. As can be appreciated by those familiar with the art of photography, construction of dark rooms and the like tends to be prohibitively expensive, particularly for the hobbiest or so-called amateur. Therefore, printing processes in which enlarged color images are photographically fixed on sensitized paper usually are preformed at commercial installations, even though the techniques employed can be performed readily by hobbiests. Moreover, commercial installations from time to time tend to become over-scheduled, with an attendant diminution of customer service and a resultant loss of good will.

In view of the foregoing, it should readily be apparent that there currently exists a need for an economic, portable photographic device which is particularly suited for use by hobbiests and the like in photographically printing enlarged color images from slides, negatives and the like.

It, therefore, is the purpose of the instant invention to provide a practical and economic device particularly suited for use by those requiring facilities in which to perform photographic color enlarging and printing operations.

OBJECTS AND SUMMARY OF THE INVENTION

It is an object of the instant invention to provide an enlarging device for use in photographically printing enlarged copies of color images from slides, negatives and the like.

It is another object to provide an economical, practical and efficient enlarging device for use by those requiring facilities for performing photographic procedures in the absence of light.

It is another object to provide a photographic device which includes a portable cabinet having a light-tight processing chamber, access to which is gained through opaque sleeves and a lamp house for projecting an image onto a sheet of sensitized paper located in said housing.

It is another object to provide a photographic device which includes a portable cabinet having a processing chamber covered by a vertically extensible bellows, a lamp house supported above the chamber and connected to the bellows for projecting into the chamber a photographic image, a floor including an easel arranged in optical alignment with the lamp house, said easel being arranged to serve as a support for a sheet of sensitized paper onto which an image is projected as well as to serve as a closure panel for a receptacle for a roll processing tube, and a paper safe having an access opening communicating with the chamber for supporting a supply of sensitized paper in an accessible relation with the processing chamber, and a pair of opaque sleeves extended into the chamber for facilitating performance of printing operations within the chamber.

Another object is to provide a device which is particularly useful in connection with a carrying out of processes for providing photographically enlarged color prints in non-commercial facilities, although not necessarily restricted in use thereto, since the device of the instant invention may be similarly useful when installed in commercial facilities and employed as an adjunct to existing dark room facilities, for limited purposes.

These and other objects and advantages are achieved through the use of a color enlarging device which includes a cabinet having a light-tight processing chamber defined by a floor, a pair of laterally spaced side walls of congruent, right-triangular configurations, characterized by an inclined top edge surface, a front wall including a jamb of rectangular configuration circumscribing an access opening located between the side walls, a pair of closure panels for closing the access opening and a light baffle interposed between said pair of closure panels and the jamb, including an endless groove and an endless rib adapted to seat in the groove, a top closure for the processing chamber including a vertically extensible bellows attached to the side walls, a vertically movable lamp house attached to the bellows, externally of the chamber, a pair of opaque sleeves mounted on the closure panels and extending therethrough for facilitating access to the processing chamber, a receptacle for a roll processing tube adapted to be employed within the processing chamber, a paper safe communicating with the processing chamber through the floor, and an easel for receiving and supporting a sheet of sensitized paper in optical alignment with the lamp house, also adapted to close the receptacle, as will become more readily apparent by reference to the following description and claims in light of the accompanying drawings.

DESCRIPTION OF THE PREFERRED EMBODIMENT

Figure 1:
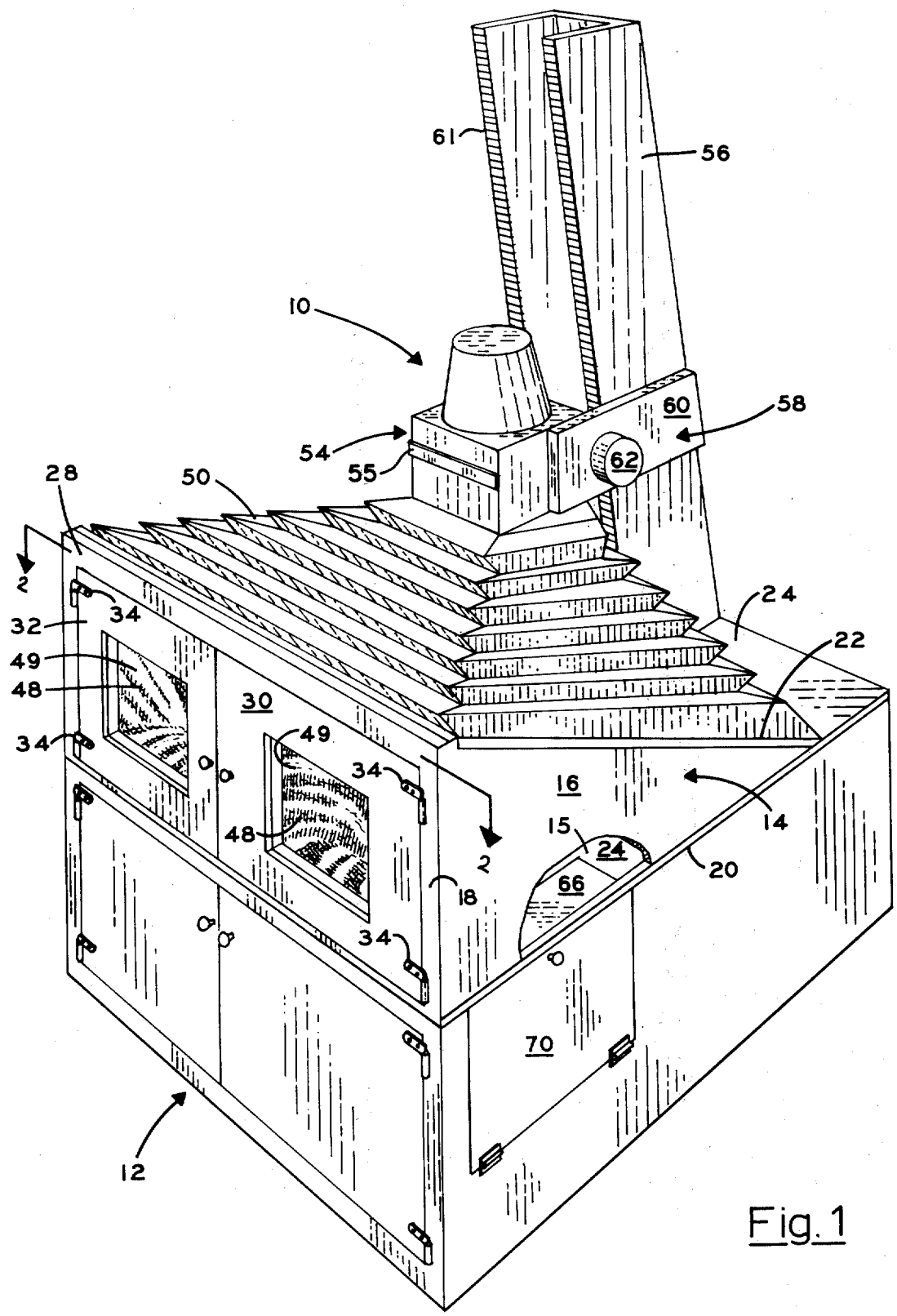
FIG. 1 is a perspective view of a color enlarging device which embodies the principles of the instant invention.

Referring now with more particularity to the drawings wherein like reference characters designate like or corresponding parts throughout the several views, there is shown in FIG. 1 a color enlarging device, generally designated 10, which embodies the principles of the instant invention.

The color enlarging device 10, as can be appreciated, is fabricated from conveniently available materials. The device 10 includes a storage chamber 11 which serves as a suitable storage facility for chemicals and the like. The chamber 11 is defined in a base cabinet 12, FIG. 1, having suitable closure panels 13, FIG. 5, supported by suitable hinges, not designated. Disposed in superimposed relation with the base cabinet 12 there is a chamber cabinet, generally designated 14, having defined therein a light-tight processing chamber 15.

The chamber cabinet 14 includes a pair of laterally spaced side walls 16 which define opposite side walls for the processing chamber 15. The side walls 16 are of congruent triangular configurations and each includes a vertical front edge 18, a horizontal bottom edge 20, and a downwardly inclined top edge 22. The side walls 16 are rigidly affixed to a common floor 24 which serves as a floor for the processing chamber 15. As a practical matter, the floor serves to separate the chamber cabinet 14 from the base cabinet 12.

Figure 5:
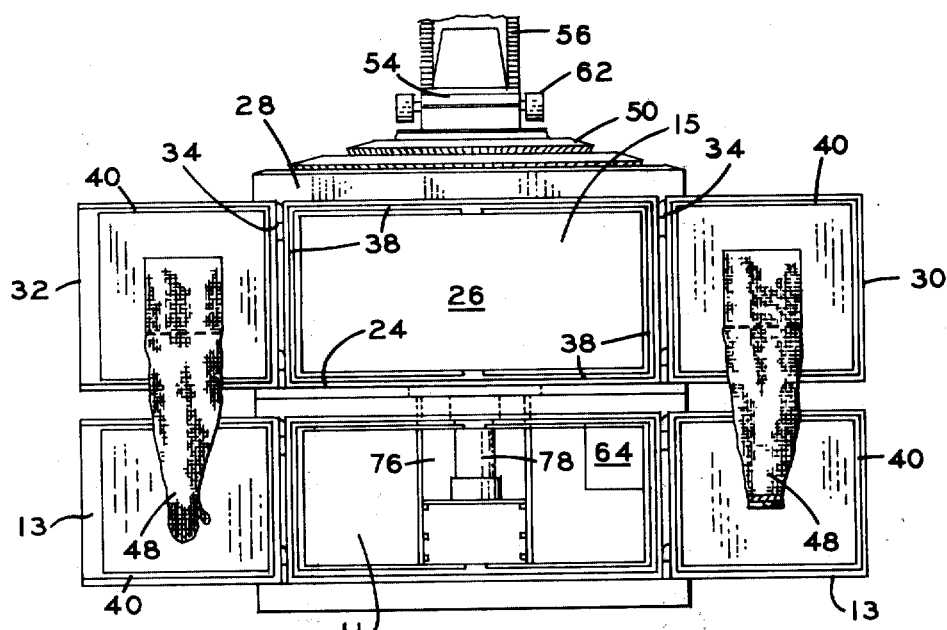
FIG. 5 is a front elevation of the device, with the closure panels therefor being depicted in an open configuration.
Figure 6:
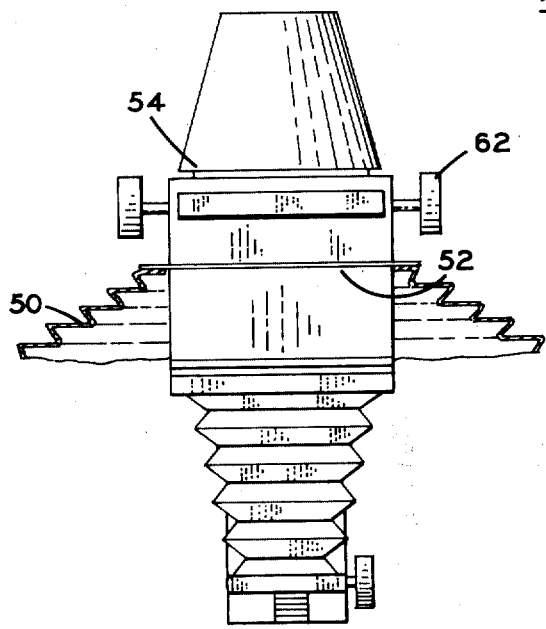
FIG. 6 is a fragmentary side elevational view of the lamp house shown in FIG. 1.
Figure 7:
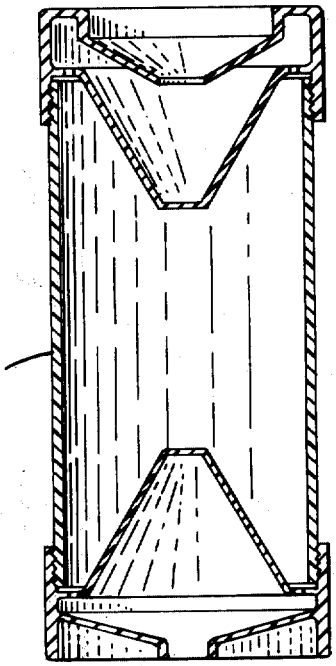
FIG. 7 is a cross-sectional view of a roll processing tube provided for processing light-exposed sensitized paper.

For purposes of accommodating access to the processing chamber 15 there is provided an access opening 26, FIG. 5. This opening is extended between the side walls 16 and is circumscribed by a rectangular member, hereinafter for the sake of convenience referred to as a jamb 28. The jamb includes both horizontally spaced vertical members and vertically spaced horizontal members, not designated, the faces of which are arranged in coplanar relation and function as impact surfaces for a pair of closure panels 30 and 32. The closure panels 30 and 32 preferably are supported for pivotal displacement by a pair of hinges 34. The hinges 34, of course, permit the closure panels 30 and 32 to be pivotally displaced outwardly, for purposes of affording access to the processing chamber 15 through the access opening 26, and inwardly for purposes of closing the access opening as the panels engage the jamb 28.

Figure 2:
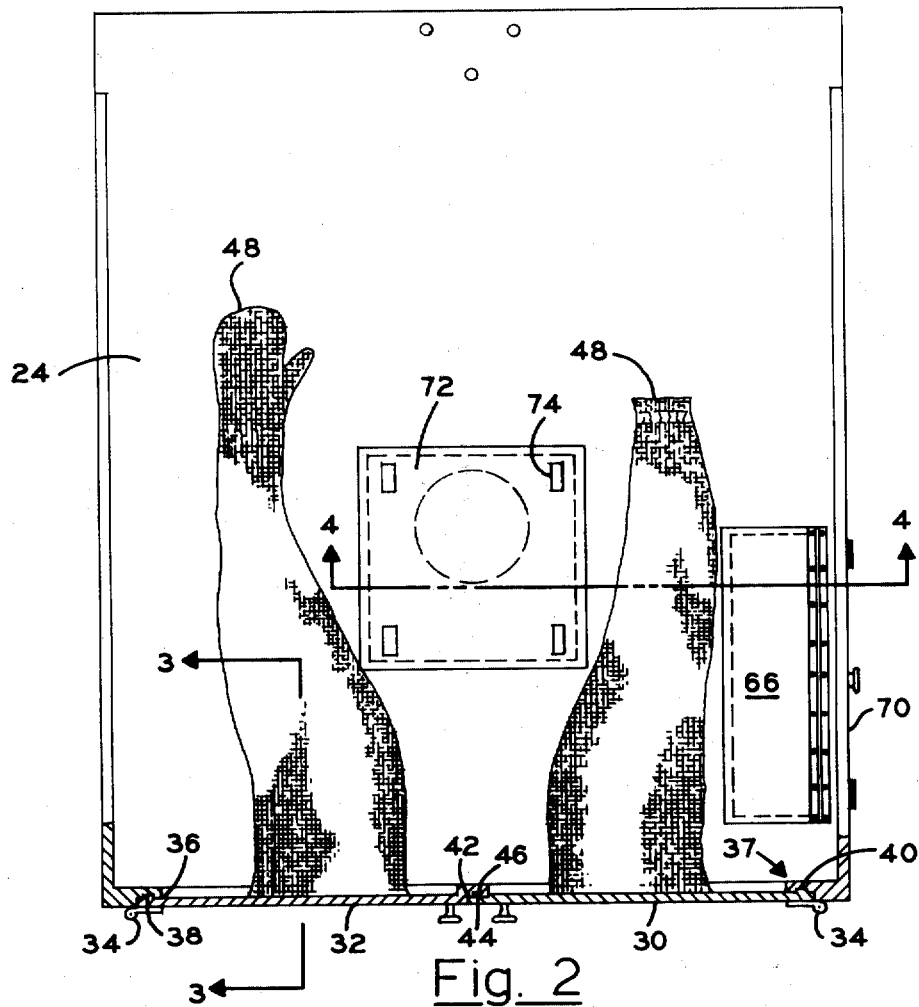
FIG. 2 is a partially sectioned top plan view of the device shown in FIG. 1.
Figure 3:
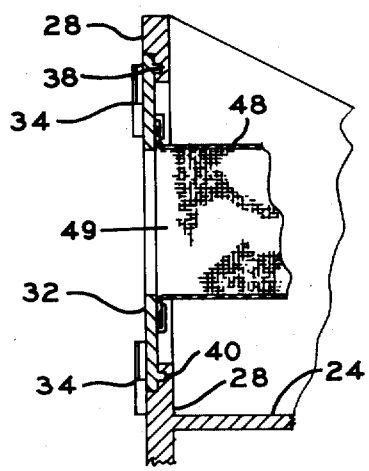
FIG. 3 is a fragmentary, partially sectioned view taken generally along lines 3—3 of FIG. 2.
Figure 4:
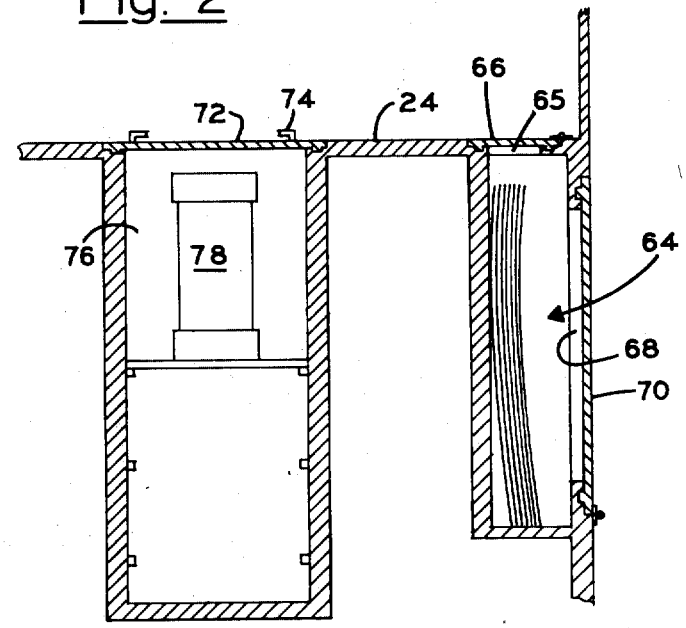
FIG. 4 is a fragmentary, partially sectioned view taken generally along lines 4—4 of FIG. 2.

It is important here to note that a light baffle is provided for assuring that a light-tight relationship is established between the panels 30 and 32, and the jamb 28. Thus passage of light into the processing chamber 15 is precluded when the access opening 26 is closed. As shown in the drawings, the baffle is formed by forming in the surface of the jamb 28 a rectangular recess 36, FIG. 2, for receiving the closure panels 30 and 32 seated in a coplanar relationship with the outermost surface of the jamb 28. Additionally, an endless groove 38 including angularly related linear segments, not designated, is extended along the surface of the jamb 28 in an outwardly facing direction, for purposes of receiving therein a rib 40 projected inwardly from the closure panels. It is to be understood that the rib 40 also includes angularly related, linear segments suitably dimensioned to be received within the groove 38 so that a light baffle is established as the closure panels 30 and 32 engage the surface of the jamb 28.

For purposes of assuring that a light-tight fit is established between the closure panels 30 and 32, when closed, a recessed lip 42 is extended from the panel 32 and has formed therein a light baffle, not designated. This baffle also includes a groove 44 which serves to receive therein a rib 46 projected from a lip, also not designated, extended from the closure panel 30. Hence, a light-tight fit is established between the closure panels 30 and 32 when the closure panels are in a closed relationship with respect to the access opening 26.

Within each of the panels 30 and 32 there is provided a pair of sleeves 48, also formed of an opaque material, which facilitates performance of manual operations within the chamber 15. Access to the sleeves 48 is afforded through an opening 49 formed in the closure panels 30 and 32 which permit an operator to extend his arms through the closure panels into the processing chamber 15. It is to be understood that, preferably, one of the sleeves 48 is provided with a glove, whereby a ready withdrawal of the hand of the operator is accommodated, while the other sleeve terminates in a cuff, not designated, which secures the sleeve about one wrist of the operator whereby the operator is permitted to employ his tactile senses to the utmost.

The processing chamber 15 is covered with an opaque bellows 50. The bellows preferably is of a truncated pyramidal configuration and includes an opening 52 defined in the apex thereof. From the base of the bellows there is projected a lip, not designated, affixed to the top of the jamb 28, the inclined top edge 22, of each of the side walls 16, and to the floor 24 at the rear of the chamber cabinet 14. Within the opening 52 there is inserted a convenient lamp house 54 to which the bellows 50 is connected in a suitable manner. The lamp house 54 is of known design and is employed in a known manner for projecting an enlarged color image, taken from negatives, slides and the like. Since the purpose and function of lamp houses are well known, a detailed description of the lamp house 54 is omitted in the interest of brevity. However, it is to be understood that the lamp house 54 is typified by a lamp house which includes a negative carriage 55 of a suitable design and a filter pack for purposes of dividing a beam of light into color components and thereafter directing the beam through an optic system which causes the beam to pass through an image bearing negative or slide and impinge upon a sensitized paper, whereupon the image is projected on the paper.

In order to accommodate a repositioning of the lamp house 54 there is provided a track 56 which is rigidly affixed to the base cabinet 12, in a suitable manner, and inclined above the bellows 50. Of course, in order to achieve a desired location for the lamp house 54, the lamp house is elevated and/or lowered along the track 56 for repositioning the lamp house with respect to the processing chamber. A truck 58 preferably is mounted on the track 56 and includes a pair of side plates 60 which serve to support the lamp house 54. As illustrated, the track 56 includes teeth 61 and a hand wheel 62 including a suitable cog wheel, not shown, mated with the teeth 61 for displacing the truck 58 along the track 56. Hence, repositioning the lamp house 54 relative to the chamber 15 is accomplished simply by rotating the hand wheel 62.

In view of the foregoing, it should be apparent that the processing chamber 15 is a light-tight chamber defined by the floor 24, the side walls 16, the closure panels 30 and 32, and the bellows 50. Thus exposure of sensitized paper within the processing chamber 15 can be avoided as an operator having his arms inserted through the sleeves 48 manipulates the sensitized paper or controls for the lamp house 54.

Storage of light sensitized paper is accommodated by a paper safe, generally designated 64, located beneath the floor 24 in a position which affords an operator an opportunity to extract sheets therefrom, prior to exposure. The safe 64 includes an access opening 65 through which access to sensitized paper stored therein is afforded from the processing chamber 15. As a practical matter, a closure panel 66, also including a light baffle similar to the baffle hereinbefore described, is provided for sealing the access opening 65 whereby accidental exposure of sensitized paper stored in the safe is avoided. Where desired, a further access opening 68 is provided through which access from the exterior base cabinet 12 is provided for thus accommodating replenishment of the safe with paper. A suitable closure panel 70, also including a light baffle similar to the light baffles afore described, is provided for closing the access opening 68.

An easel 72 is positioned within the chamber 15, in a target zone for the lamp house 54. The easel serves to receive thereon a sheet of sensitized paper which is, in operation, photographically exposed as a beam of light is projected from the lamp house 54. As a practical matter, the easel 72 also is provided with suitable means for supporting sensitized paper as it is photographically exposed. Clips 74 serve quite satisfactorily for this purpose.

Immediately beneath the easel 72 there is provided a receptacle 76 which serves to house a cylindrical processing tube 78. The design and function of the processing tube 78 also are well known and form no specific part of the instant invention. Therefore, a detailed description of the processing tube 78 is omitted in the interest of brevity. However, it is to be understood that the tube 78, in practice, serves to receive a sheet of exposed sensitized paper and a bath of photo chemicals. The sheet and bath are introduced into the tube, in a known manner, whereupon the tube is positioned on its cylindrical surface and rolled, manually, for purposes of causing the bath to wet the sheet of sensitized paper confined within the tube for purposes of treating the sensitized paper for thus fixing an image thereon. By positioning the receptacle 76 immediately beneath the easel 72, the easel 72 is permitted to function as a light-tight closure panel for the receptacle. Where desired, the closure panels 13 also abut a jamb, not designated, similar to the jamb 28, and include ribs 40 adapted to seat in a groove, not designated, whereby the closure panels 13 seat in a light-tight relationship with the adjacent jamb for thus excluding light from the chamber 11 and, hence, from the receptacle 76.

OPERATION

It is believed that in view of the foregoing description, the operation of the device will readily be understood and it will be briefly reviewed at this point.

With the color enlarging device 10 assembled in the manner hereinbefore described, it is prepared for operation by first stocking the paper safe 64, and then removing the processing tube 78 from the receptacle 76. Of course, the closure panels 13 preferably are secured for closing the chamber 11, however, chamber 15 is open. A slide, or negative, bearing an image to be enlarged and printed is now positioned in the negative carriage of the lamp house 54 while a white sheet of paper, approximately the same thickness as the sheet of sensitized paper to be exposed, subsequently, is positioned on the easel 72. The image to be printed is now projected onto the sheet of paper as a light beam is propagated through the optics of the lamp house 54. Of course, the lamp house 54 is adjustably positioned relative to the chamber 15 by manipulating the hand wheel 62. Once a suitable focus and positioning of the image relative to the paper is achieved, the paper is removed from the easel 72.

The closure panels 30 and 32 are now positioned in a closed relationship with the access opening 26 for which they are provided. An operator now inserts his arms through the sleeves 48 and removes a sheet of sensitized paper from the paper safe 64 and positions it on the easel 72. A suitable timer switch, not shown, is closed whereupon the lamp house 54 is activated for thus exposing the sheet of sensitized paper now positioned on the easel 72. At the end of the exposure period, the sheet of exposed sensitized paper is removed from the easel and placed in the processing tube 78, without opening the closure panels 30 and 32. Since the tube 78 is a light-tight tube, the closure panels 30 and 32 are opened after the paper has been inserted therein. Processing of the exposed sensitized paper now is performed in the manner well understood by those familiar with the use of roll processing tubes.

In view of the foregoing, it should readily be apparent that the device of the instant invention provides a practical solution to the problem of affording those not equipped with commercial dark rooms and the like a suitable device for photographically fixing enlarged copies of color images.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. A color enlarging device for photographically fixing enlarged copies of color images comprising:

A. a cabinet including a light-tight processing chamber defined by a floor, a pair of laterally spaced upright walls, each being of a right-triangular configuration and having an inclined top edge surface, and a front wall comprising a jamb of rectangular configuration circumscribing an access opening, a pair of closure panels for closing said access opening and a light baffle interposed between said pair of closure panels and said jamb including an endless groove and an endless rib adapted to seat in said groove, and a top closure for said processing chamber including a vertically extensible bellows attached to said walls;

B. a pair of opaque sleeves mounted on said pair of closure panels and extended therethrough for facilitating access to said processing chamber;

C. a roll processing tube adapted to be employed in processing exposed sensitized paper within said processing chamber;

D. means defining a receptacle for said processing tube communicating with said processing chamber through an opening formed in the floor of said chamber;

E. a paper safe communicating with said processing chamber through another opening formed in the floor of said chamber and a closure panel for closing the other opening;

F. an easel for receiving and supporting a sheet of sensitized paper adapted to be seated in a light-tight closing relationship with the opening formed in the floor of said chamber;

G. a lamp house connected to said bellows communicating with said processing chamber and having an optics system aligned with the easel for projecting a color image on a sheet of sensitized paper supported by the easel; and H. means including an inclined rail mounted on said cabinet supporting said lamp house for movement in a vertical plane above said processing chamber.

2. A color enlarging device for providing enlarged color images taken from negatives, slides and the like comprising:

A. a cabinet having means defining therein an internal, light-tight chamber including a pair of upstanding side walls, each of said walls being of substantially right-triangular configuration including a substantially horizontally oriented bottom edge surface, a front edge surface normally related to the bottom edge surface, and a downwardly inclined top edge surface, a removable closure panel defining an access door for the processing chamber, and a tubular bellows attached to said pair of side walls defining an extensible cover for said processing chamber;

B. an easel for receiving a sheet of sensitized paper disposed within said chamber;

C. means for photographically exposing a sheet of sensitized paper received by said easel including a movable lamp housing externally related to the chamber and adapted to project a photographic image on said sheet; and D. means for facilitating digital manipulation of the sheet of sensitized paper within said chamber including a flexible sleeve mounted on said cabinet.

3. The device of claim 2 further comprising a roll processing tube disposed within the chamber for receiving a sheet of exposed sensitized paper.

4. The device of claim 3 further comprising a receptacle for supporting said tube in an accessible relationship with the chamber and a safe for supporting a plurality of sheets of sensitized paper in communication with the chamber.

5. The device of claim 4 wherein said easel comprises a light-tight closure member for said receptacle and said safe includes a normally closed access opening for affording access from the exterior of said cabinet, and a normally closed access opening for affording access from said processing chamber.

6. The device of claim 2 wherein said closure panel comprises one of a pair of similar closure panels.

7. The device of claim 6 wherein said means for facilitating manipulation of the sheet includes a light-tight sleeve mounted on and extended through each closure panel of said pair.

8. The device of claim 7 wherein said means for photographically exposing a sheet of sensitized paper further includes a truck, a horizontally oriented plate supporting said lamp house and an inclined rail supporting said truck for simultaneous movement in both vertical and horizontal directions above said processing chamber.

9. In a color enlarging device for providing enlarged color images taken from negatives, slides and the like, the combination comprising:

A. a cabinet having defined therein a processing chamber normally maintained in a light-tight condition defined by means including a pair of upstanding side walls, each being characterized by a substantially horizontally oriented bottom edge surface, a front edge surface normally related to the bottom edge surface, and a downwardly inclined top edge surface, a removable closure panel defining an access door for the processing chamber, and a tubular bellows attached to said pair of side walls defining an extensible cover for said processing chamber;

B. an easel disposed within said chamber adapted to receive a sheet of sensitized paper;

C. means for photographically exposing a sheet of sensitized paper received by said easel including a movable lamp housing externally related to the chamber;

D. a roll processing tube disposed within said chamber for receiving said sheet of sensitized paper while a light-tight condition for said chamber is maintained; and E. means including a flexible sleeve extended into the chamber for facilitating simultaneous digital manipulation of the sheet of sensitized paper and said roll processing tube while maintaining the chamber in a light-tight condition.

* * * * *